United States Patent
Li et al.

(10) Patent No.: US 8,181,886 B2
(45) Date of Patent: May 22, 2012

(54) THERMOSTATIC MIXING VALVE

(75) Inventors: Keping Li, Jiujiang (CN); Jusheng Xiong, Sanming (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 0 days.

(21) Appl. No.: 13/020,981

(22) Filed: Feb. 4, 2011

(65) Prior Publication Data
US 2011/0127339 A1    Jun. 2, 2011

Related U.S. Application Data

(63) Continuation of application No. 12/214,272, filed on Jun. 17, 2008, now Pat. No. 7,905,424.

(30) Foreign Application Priority Data

Jun. 13, 2008 (GB) .................................. 0810938.1

(51) Int. Cl.
*G05D 23/13* (2006.01)
(52) U.S. Cl. .................................. 236/12.18; 236/12.2
(58) Field of Classification Search ................. 236/12.1, 236/12.11, 12.16, 12.17, 12.18, 12.2, 12.23, 236/93 R; 137/625, 625.4
See application file for complete search history.

(56) References Cited

U.S. PATENT DOCUMENTS

| | | |
|---|---|---|
| 4,349,149 A | 9/1982 | Humpert |
| 4,651,770 A | 3/1987 | Denham et al. |
| 4,669,653 A | 6/1987 | Avelov |
| 4,796,666 A | 1/1989 | Bergmann |
| 5,025,983 A | 6/1991 | Akita |
| 5,107,884 A | 4/1992 | Orlandi |
| 5,927,597 A | 7/1999 | Bolgar et al. |
| 6,089,462 A | 7/2000 | Osvaldo |
| 6,220,294 B1 | 4/2001 | Ko |
| 6,315,210 B1 | 11/2001 | Kline |
| 6,325,295 B1 | 12/2001 | Lorch |
| 6,364,210 B1 | 4/2002 | Lorch |
| 7,770,808 B2 * | 8/2010 | Ruga et al. .................. 236/12.2 |
| 2008/0035744 A1 | 2/2008 | Mace et al. |
| 2008/0164330 A1 | 7/2008 | Wei et al. |

FOREIGN PATENT DOCUMENTS

| | | |
|---|---|---|
| CN | 200958653 Y | 10/2007 |
| EP | 0611260 A1 | 8/1994 |

* cited by examiner

*Primary Examiner* — Marc Norman
(74) *Attorney, Agent, or Firm* — McDermott Will & Emery LLP

(57) ABSTRACT

The invention provides a thermostatic mixing valve for use within a water discharge fixture. The mixing valve comprises a cover defining an interior region, a stationary lower disk residing within the interior region, and a moveable upper disk. The lower and upper disks each have a central opening and at least one peripheral groove, wherein the grooves are alignable to form a peripheral water outlet. The mixing valve also includes a spindle assembly extending through the cover region and operably connected to the upper disk to enable alignment of the grooves and formation of the water outlet. A pressure relief cavity is formed between the spindle assembly and the cover, and wherein water flows through an opening in the spindle assembly and into the relief cavity. In order to reduce friction during operation of the valve, the water in the pressure relief cavity applies downward pressure to the spindle assembly which counter-balances upward pressure applied to the spindle assembly by water flowing through the lower and upper disks. The mixing valve further includes a slide bolt and a mixer, wherein depending upon the selected discharge water temperature, water from the cold and hot water cavities flows through the slide bolt into the mixer for subsequent discharge through the fixture.

10 Claims, 10 Drawing Sheets

US 8,181,886 B2

THERMOSTATIC MIXING VALVE

RELATED APPLICATION

This application is a Continuation Application of, and claims priority from, U.S. patent application Ser. No. 12/214,272 filed Jun. 17, 2008, which claims priority from British Patent Application No. GB0810938.1, filed Jun. 13, 2008.

TECHNICAL FIELD

The invention relates to a thermostatic water mixing valve that is installed in a water discharging fixture, such as a faucet or showerhead. The mixing valve includes a number of internal structures that interact to define a hot water flow path, a cold water flow path, two outlet flow paths and at least one relief flow path that enable the mixing valve to discharge a mixed water composition at the volume and temperature selected by the user.

BACKGROUND OF THE INVENTION

Thermostatic water mixing valves are well-known, and can be found in both residential and commercial settings. In either setting, the mixing valve combines two water flows, primarily hot and cold water flows, into a stream of mixed temperature water for discharge from the mixing valve and through a fixture, such as a showerhead or faucet. While such conventional mixing valves provide some benefits, including regulated water outlet flow, they nevertheless have certain limitations. For example, the internal components of conventional mixing valves are susceptible to high levels of friction and premature wear, which reduces ease of operation and the life of the valve. Also, conventional mixing valves are susceptible to imprecise temperature control of the mixed water which is discharged from the fixture to which the mixing valve is operably connected. Examples of conventional mixing valve having these limitations are found in U.S. Pat. No. 6,315,210 to Kline; U.S. Pat. No. 6,089,462 to Osvaldo; No. 6,364,210 to Lorch; U.S. Pat. No. 6,220,294 to Ko; and, U.S. Pta. No. 5,107,884 to Orlandi.

The present invention is provided to solve the limitations of conventional mixing valves discussed above and other problems, and to provide advantages and aspects not provided by prior mixing valves. A full discussion of the features and advantages of the present invention is deferred to the following detailed description, which precedes with reference to the accompanying drawings.

SUMMARY OF THE INVENTION

The present invention is directed to a thermostatic water mixing valve. The mixing valve includes a number of internal structures that interact to define a hot water flow path, a cold water flow path, two outlet flow paths and at least one relief flow path. These interacting structures enable the mixing valve to discharge to the faucet a mixed water composition having the flow volume and temperature desired by the operator of the faucet. The mixed water composition correlates to a cold water discharge position, a warm or intermediate water discharge position, and/or a hot water discharge position.

According to one aspect of the invention, the mixing valve comprises two essential portions, a flow control assembly and a temperature control assembly. The flow control assembly includes: a cover, a bushing, a spindle regulator, a rotatable upper disk, and a stationary lower disk. The spindle regulator has at least one relief hole and relief path for balancing internal and external pressure. The upper and lower disks each have a central opening and at least one peripheral groove, wherein the grooves are alignable to provide a path for water flow. The upper disk is operatively joined to the spindle regulator, whereby rotation of the upper disk alters the relative alignment of the grooves to control water flow out of the mixing valve.

According to another aspect of the invention, the temperature control assembly includes: a stem, a spindle which is inserted through a central opening in the flow control assembly, a strut and a press cap. The operator arrives at the desired temperature by rotating an external handle coupled the spindle, which raises or lowers the position of the strut and press cap. The temperature control assembly also includes: a protecting spring, a tightening nut, a guide, a temperature sensor, a mixer, a slide bolt, a lower spring, and a base with both hot and cold water inlets. The lower spring and slide bolt are located within the base. The space between the base and the lower edge of the slide bolt defines a curvilinear, preferably annular, hot water cavity. The space between the base and the upper edge of slide bolt defines a curvilinear, preferably annular, cold water cavity. The space between stem, the slide bolt, and the mixer defines a curvilinear, preferably annular, water mixing cavity. The position of the temperature sensor varies with the temperature of the water in the mixing cavity. The temperature sensor moves downwardly when the mixed water temperature exceeds the setting, which reduces the size of the hot water inlet. When the temperature of the mixed water is below the setting, the temperature sensor moves upwardly which increases the size of the hot water inlet. The rotation of the spindle raises or lowers the position of the strut and press cap, which contacts the temperature sensor to alter its position.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
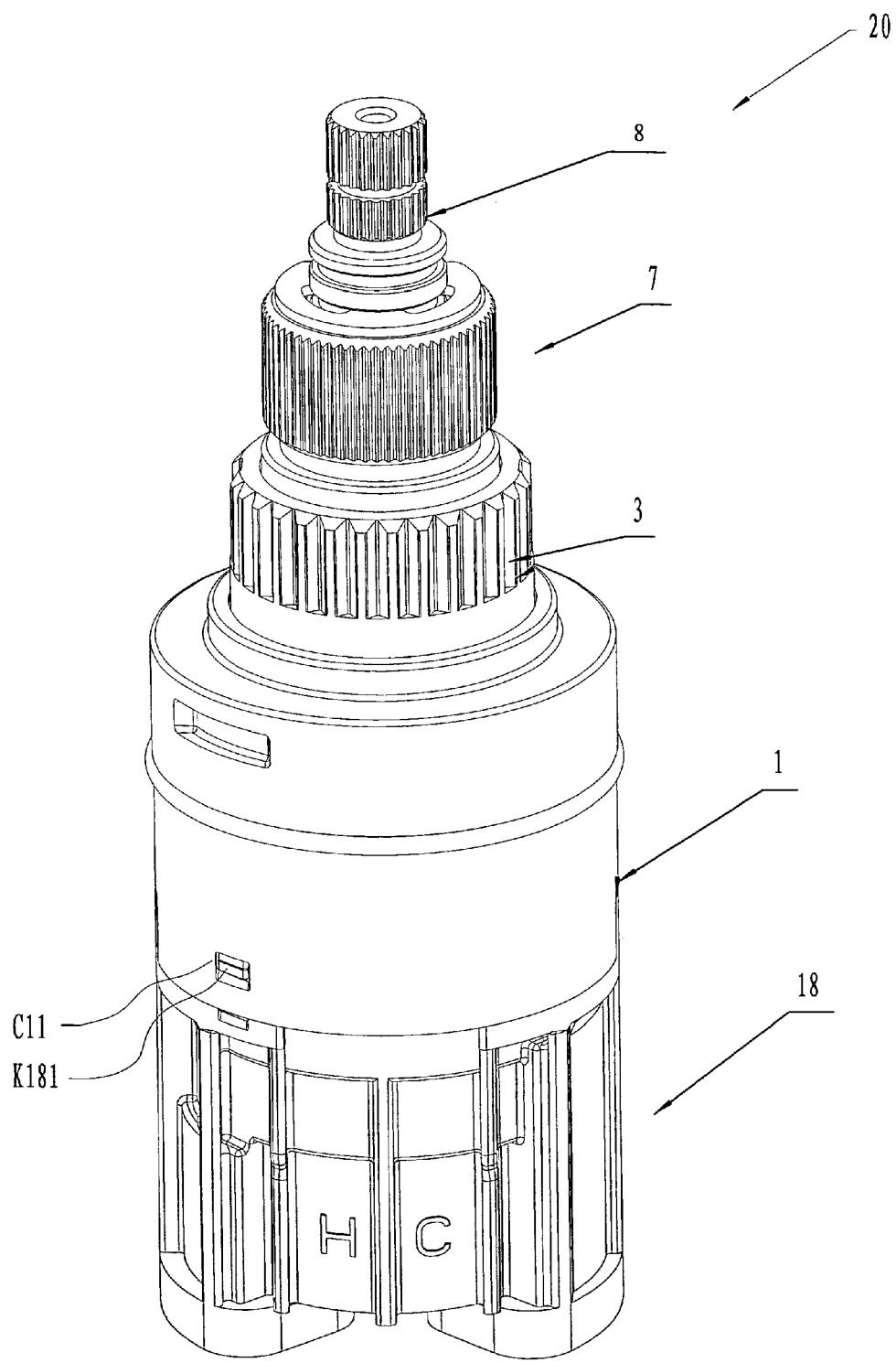
FIG. 1 is a perspective view of a mixing valve of the invention, showing the mixing valve in an assembled position.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1-8 show a thermostatic water mixing valve 20 that is installed within a water delivery fixture, such as a faucet or showerhead. As explained in greater detail below, the mixing valve 20 includes a number of internal structures that interact to define a number of flow paths for hot and cold water and at least one outlet flow path. In one embodiment, the mixing valve 20 includes a hot water inlet flow path K11, a cold water inlet flow path K12, a mixer flow path G1, at least one pressure relief flow path K17 and two outlet flow paths K15, K16. These interacting structures enable the mixing valve 20 to discharge a mixed water composition having the flow volume and temperature desired by the operator of the faucet. As may be seen in FIG. 1, when the spindle regulator 3 is turned clockwise, the discharge flow volume is decreased; while turning the spindle regulator 3 counterclockwise increases the discharge flow volume. When the spindle 8 is turned clockwise, the discharge water temperature is lowered or made colder; while turning the spindle 8 counterclockwise increases the discharge water temperature. Thus, a user can actuate the handle(s) operably connected to the spindle 8 and the spindle regulator 3 to attain the desired temperature and volume of water supplied by the valve 20 to the fixture in which the valve 20 is installed.

Figure 2:
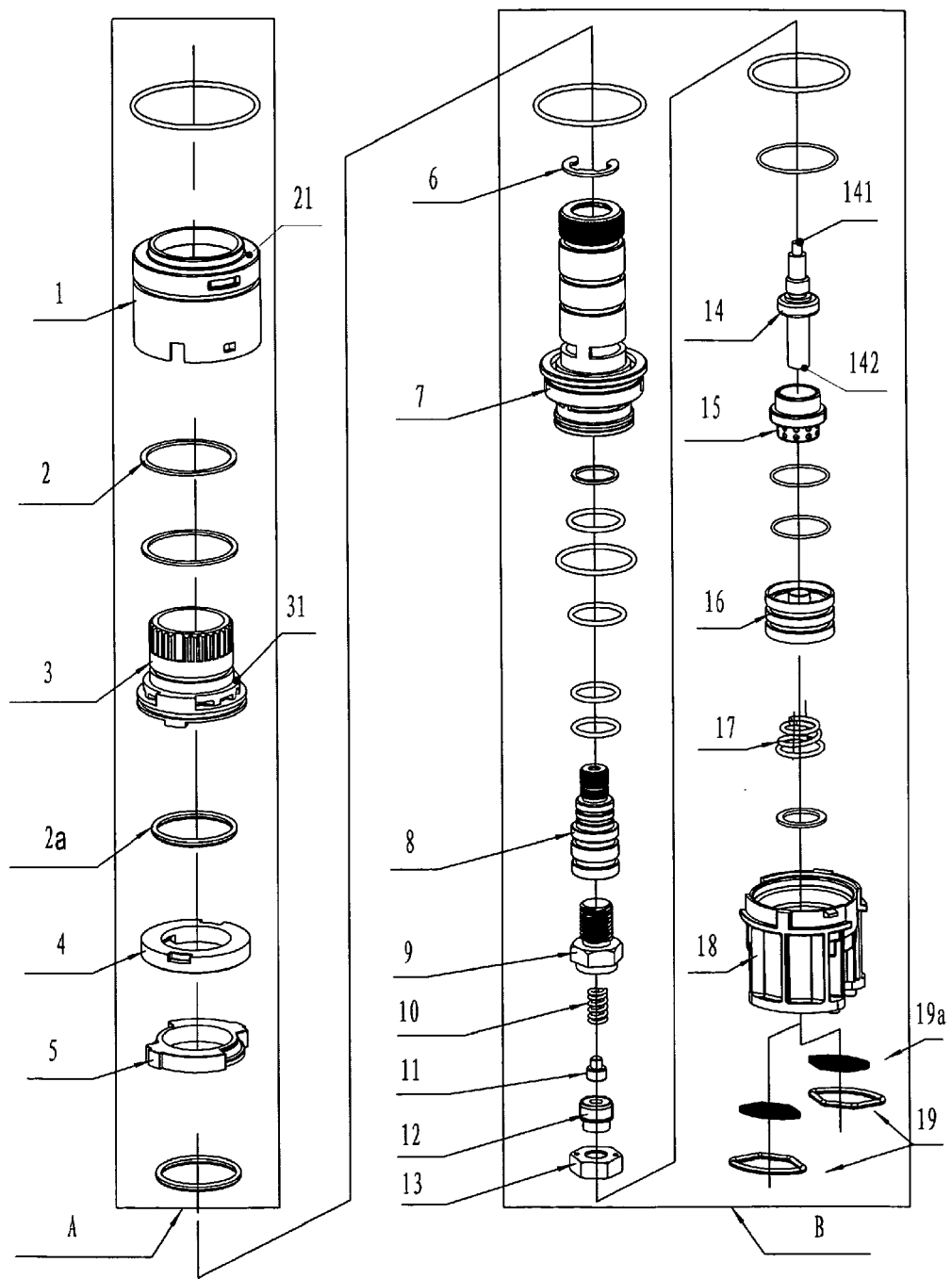
FIG. 2 is an exploded view of the mixing valve, showing the various components of the mixing valve.

Referring to FIG. 2, the mixing valve 20 includes a discharge flow volume control assembly A and a discharge temperature control assembly B. The flow volume control assembly A comprises a number of components, including a cover 1, at least one bushing 2, at least one gasket 2a and a spindle regulator 3, a rotatable upper disk 4, and a stationary lower disk 5. The temperature control assembly "B" comprises a number of components, including a retaining element 6, a stem 7, a spindle 8, a strut 9, a protecting spring 10, a press-cap 11, a tightening nut 12, a guide 13, a temperature sensor 14, a mixer 15, a slide bolt 16, a spring 17, a base 18 and at least one gasket 19.

Figure 3:
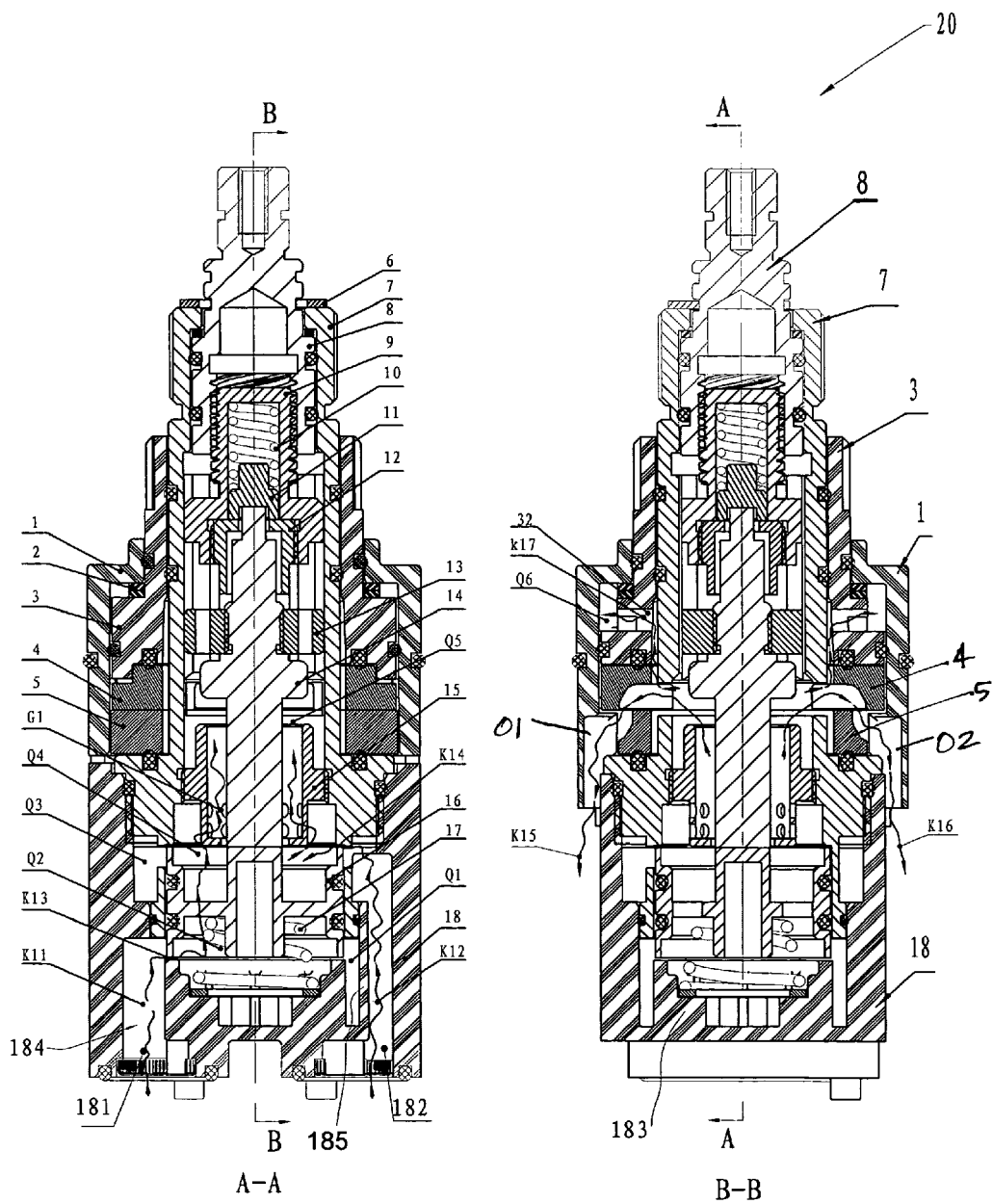
FIG. 3 provides two longitudinal cross-section views of the mixing valve, showing the mixing valve in an intermediate or warm water position.

Referring to FIGS. 1 and 3, the cover 1 defines an interior region, and when connected to the base 18 defines an enclosed region, wherein the majority of the components of the flow volume control assembly A and temperature control assembly B are located. To maintain this connection, the cover 1 has two notches D11 and D12 which engage with two projections T181 and T182 of the base 18. The cover 1 also has two small holes C11 and C12 for receiving two small protrusions K181 and K182 of the base 18. Referring to section B-B of FIG. 3, a lower extent of the cover 1 extends past or overhangs an upper extent of the base 18. The upper disk 4 and lower disk 5 are positioned within the interior region of the cover 1 in a stacked configuration. The lower disk 5 has radially outwardly protrusions T51 and T52 (see FIGS. 2, 3 and 4a-e) which engage with two recesses D13 and D14 of the cover 1 to render the lower disk 5 stationary.

As shown in FIGS. 2, 3, 4b, 4c, 4d, the upper face 4a of the rotatable upper disk 4 has two notches D41 and D42 which are configured to engage two depending fingers or protrusions T31, T32 of the spindle regulator 3. Rotation of the spindle regulator 3 by the operator will result in corresponding rotation of the upper disk 4, which is positioned on the lower disk 5. The lower face of the upper disk 4 also has at least one groove A41 that is alignable with a groove A51 of the lower disk 5 to form a water outlet. In a preferred embodiment, the upper disk 4 has a first groove A41 and a second groove A42, wherein the first groove A41 is alignable with a first groove A51 of the lower disk 5 to form a first water outlet and the second groove A42 is alignable with a second groove A52 of the lower disk 5 to form a second water outlet. Preferably both the grooves A41, A42 and the grooves A51, A52 are in an opposed positional relationship. The upper disk 4 and the lower disk 5 each have a central opening 43, 53 that provides the disk 4, 5 with an annular configuration. Regarding the lower disk 5, the grooves A51, A52 are preferably coincident with an outer disk edge 54 and radially outward of the inner edge 55. The groove A41, A42 of the upper disk 4 is coincident with an inner edge 44 of the upper disk 4 and radially inward of the outer edge 45. Referring to FIGS. 5a-c which show the disks 4, 5 in a stacked, assembled position, the diameter of the upper disk 4 is preferably greater than the diameter of the lower disk 5. The inner edge A411, A421 of the upper disk groove A41, A42 is preferably substantially aligned with the inner edge 55 of the lower disk 5. Also, the inner edge A511, A521 and outer edge A512, A522 of the lower disk groove A51, A52 is preferably positioned between the inner and outer edges 44, 45 of the upper disk 4. Preferably, the upper disk groove A41, A42 is radially inward of and does not intersect the outer edge 45 of the upper disk 4, and the lower disk groove is A51, A52 is radially outward of and does not intersect an inner edge 55 of the lower disk 5.

As may be seen in FIGS. 2, 3, 4a, 4b, at least one bushing 2 is positioned between the neck 21 of the cover 1 and the collar 31 of the spindle regulator 3 for reducing the friction when turning the spindle regulator 3. The flow control assembly A further includes at least one sealing element 2a for sealing the various components therein. A spindle assembly 3a comprises the elongated spindle 8 which extends through the elongated stem 7, wherein both the spindle 8 and the stem 7 extend through the cover 1. The spindle assembly 3a further comprises the spindle regulator 3 that extends through the cover 1, wherein the spindle 8 and the stem 7 extend through the spindle regulator 3. An intermediate portion of the stem 7 extends into the central opening 43 of the upper disk 4 and the central opening 53 of the lower disk 5. As explained below in greater detail, actuation of the spindle assembly 3a moves the upper disk 4 such that the upper disk groove D41, D42 is aligned with the lower disk groove A51, A52 to define the peripheral water outlet. The spindle regulator 3 also has two upwardly projections D31, D32 that engage inward projections E11, E12 of the cover 1 (see FIG. 4a), wherein these structures interact to restrict the turning angle of the spindle regulator 3 between 0 degree and 90 degrees.

FIG. 5a shows an open position of valve 20 attained by actuation of the spindle assembly 3a. The turning angle is 90 degrees and the first groove A51 of the lower disk 5 is fully aligned with the first groove A41 of the upper disk 4 to form a first water outlet O1 that accommodates the first flow path K15. Also, the second groove A52 of the lower disk 5 is fully aligned with the second groove A42 of the upper disk 4 to form a second water outlet O2 that accommodates the second flow path K16. FIG. 5b shows an intermediate or mixed position, wherein the turning angle is between 0 degree and 90 degrees. The first groove A51 of the lower disk 5 is partially aligned with a first groove A41 of the upper disk 4 to form the first water outlet O1 that accommodates a reduced first flow path K15. The second groove A52 of the lower disk 5 is partially aligned with the first groove A41 of the upper disk 4 to form the second water outlet O2 that accommodates a reduced second flow path K16. FIG. 5c shows a closed position, wherein the turning angle is substantially 0 degrees. The first groove A51 of the lower disk 5 is misaligned with a first groove A41 of the upper disk 4 thereby precluded the formation of a water outlet. The second groove A52 of the lower disk 5 is also misaligned with second groove A42 of the upper disk 4 thereby precluding the formation of a water outlet. In the closed position, the upper disk groove A41, A42 is positioned substantially 90 degrees from the lower disk groove A51, A52 in the closed position.

Figure 4A:
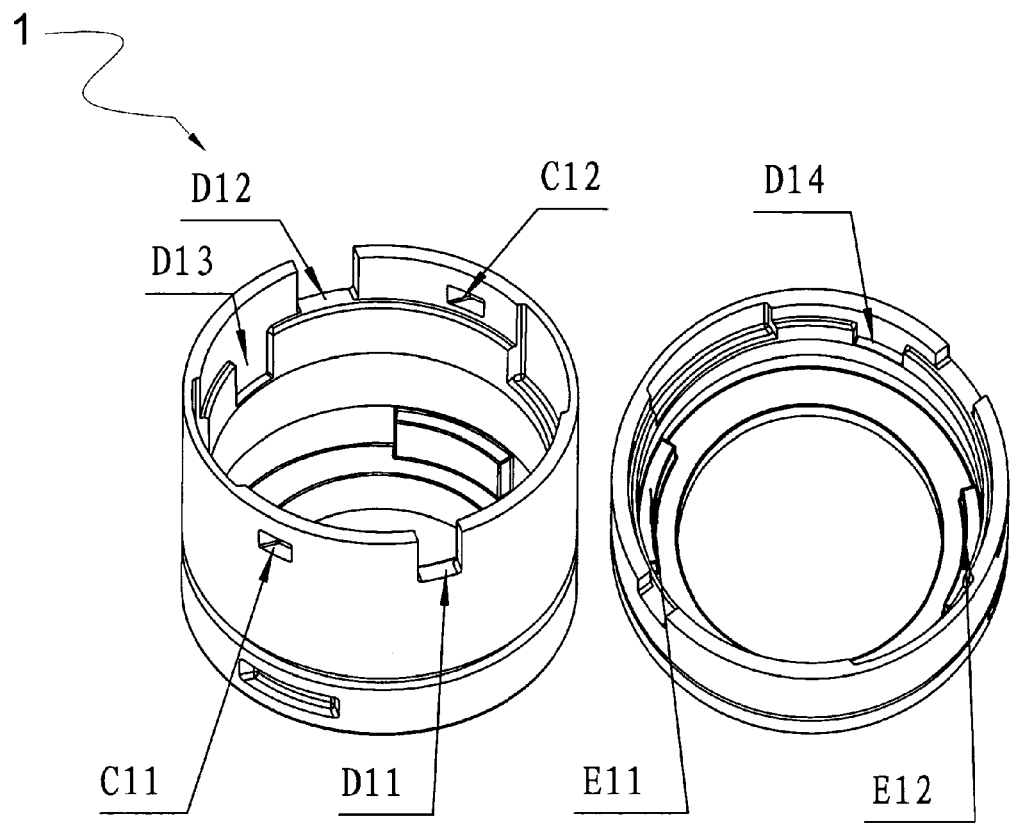
FIG. 4a shows top and bottom perspective views of a cover of the mixing valve.
Figure 4B:
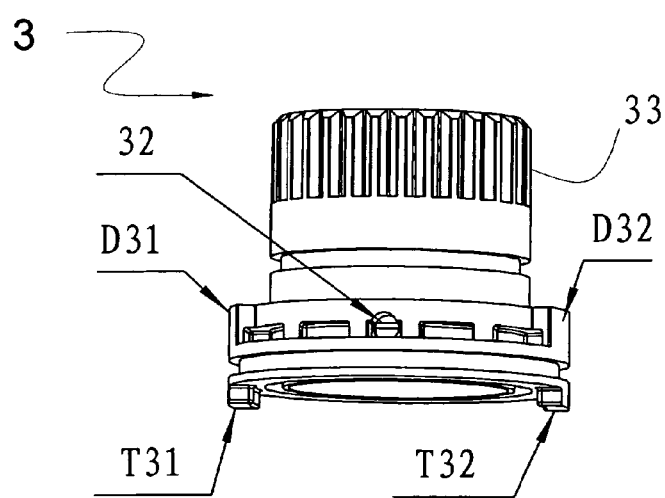
FIG. 4b is a perspective view of a spindle regulator of the mixing valve.
Figure 4C:
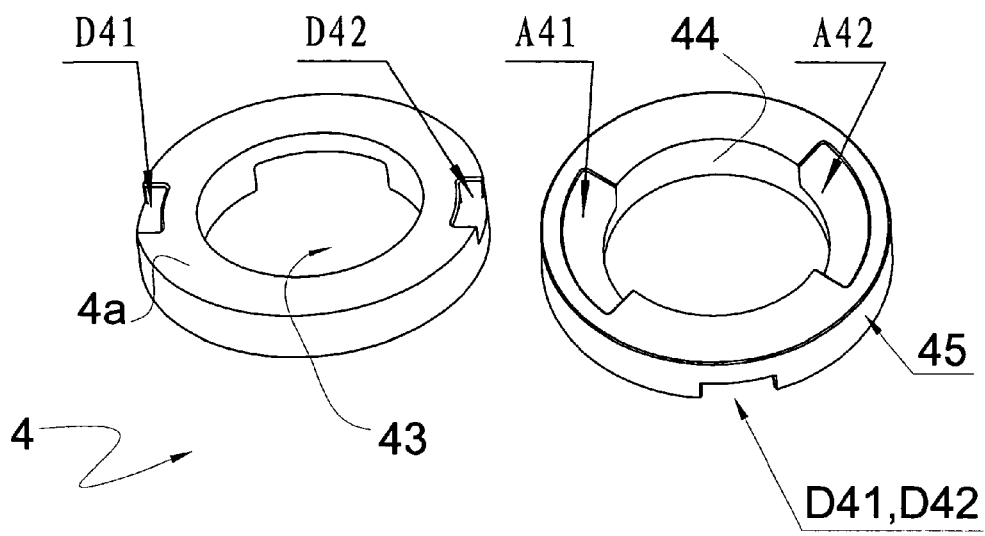
FIG. 4c shows top and bottom perspective views of an upper disk of the mixing valve.
Figure 4D:
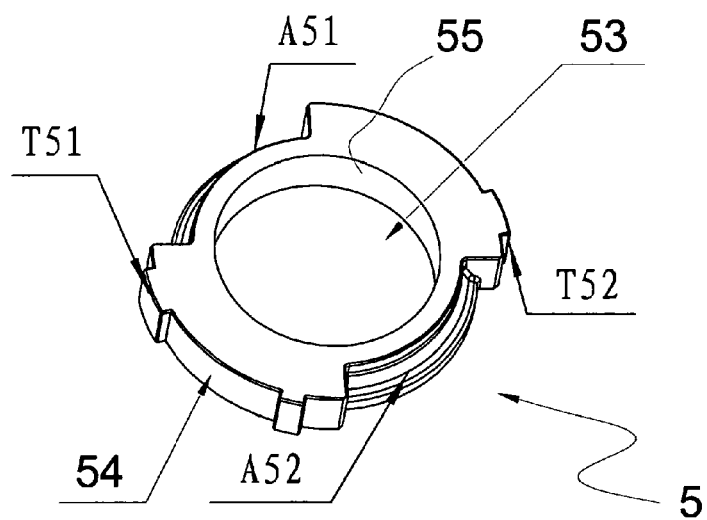
FIG. 4d is a perspective view of a lower disk of the mixing valve.
Figure 4E:
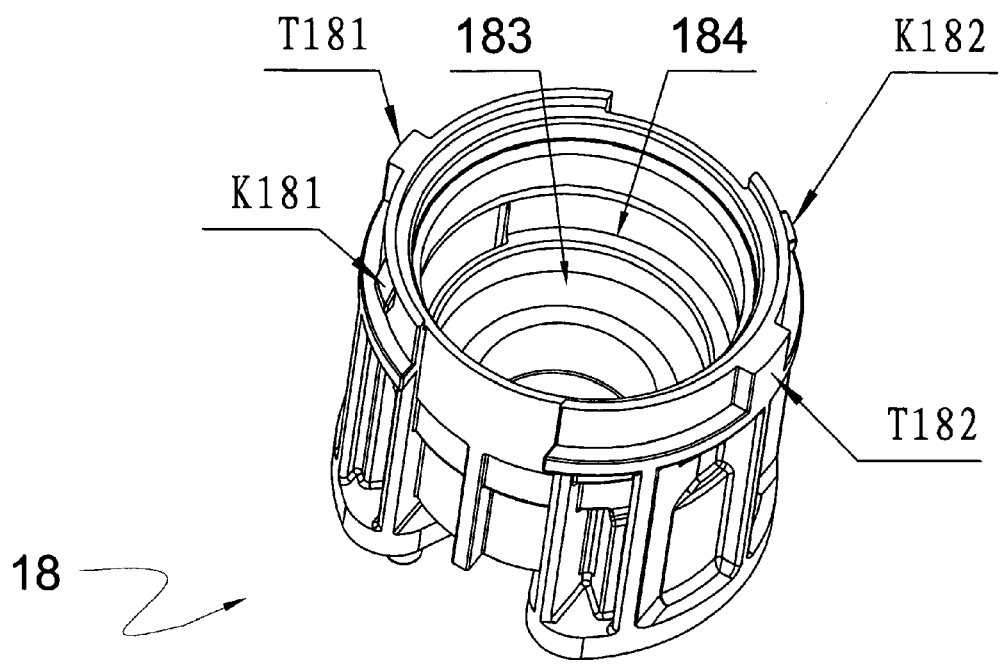
FIG. 4e is a perspective view of a base of the mixing valve.
Figure 4F:
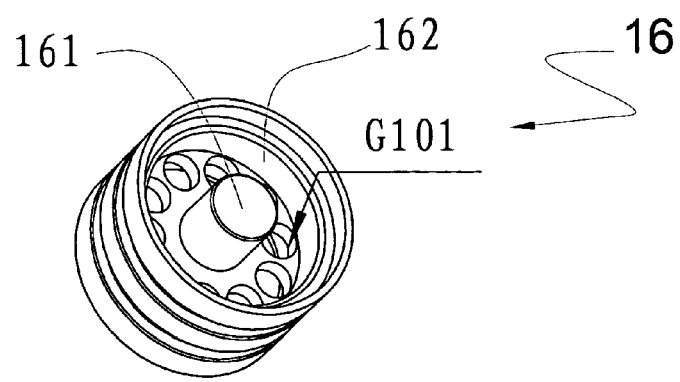
FIG. 4f is a perspective view of a slide bolt of the mixing valve.
Figure 5A:
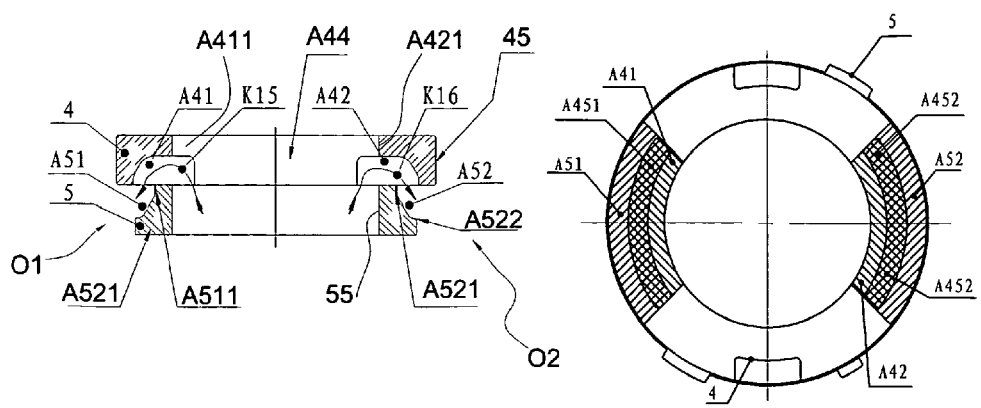
FIG. 5a is a schematic view of the disk assembly in an aligned position, showing grooves of the upper and lower disks are fully aligned to form two water outlets.
Figure 5B:
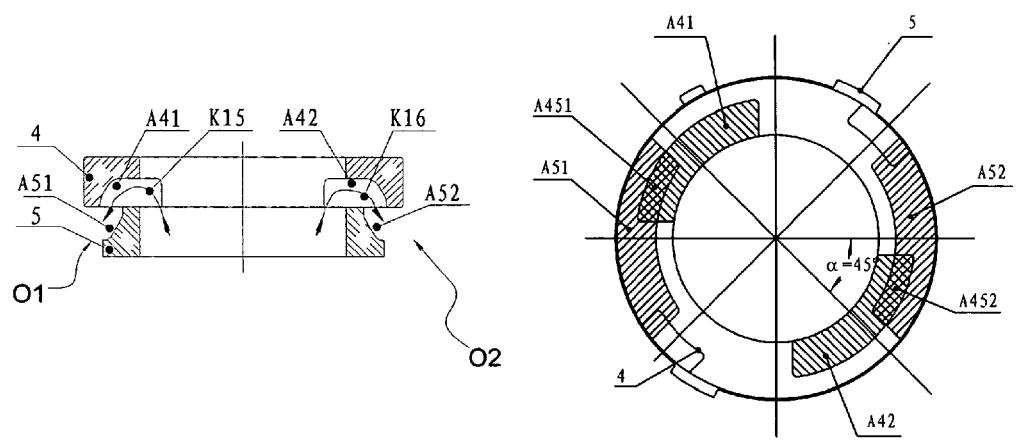
FIG. 5b is a schematic view of the disk assembly in a partially aligned position, showing grooves of the upper and lower disks partially aligned to form two water outlets.
Figure 5C:
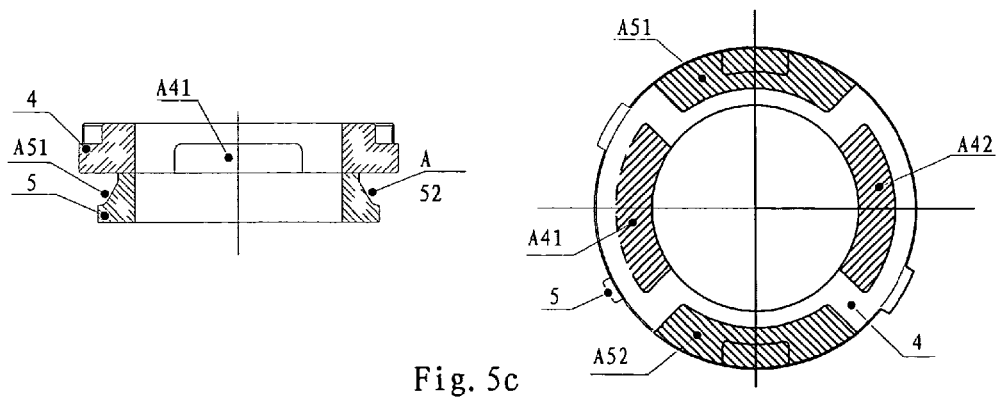
FIG. 5c is a schematic view of the disk assembly in a misaligned position, showing grooves of the upper and lower disks misaligned to prevent the formation of water outlets.
Figure 6:
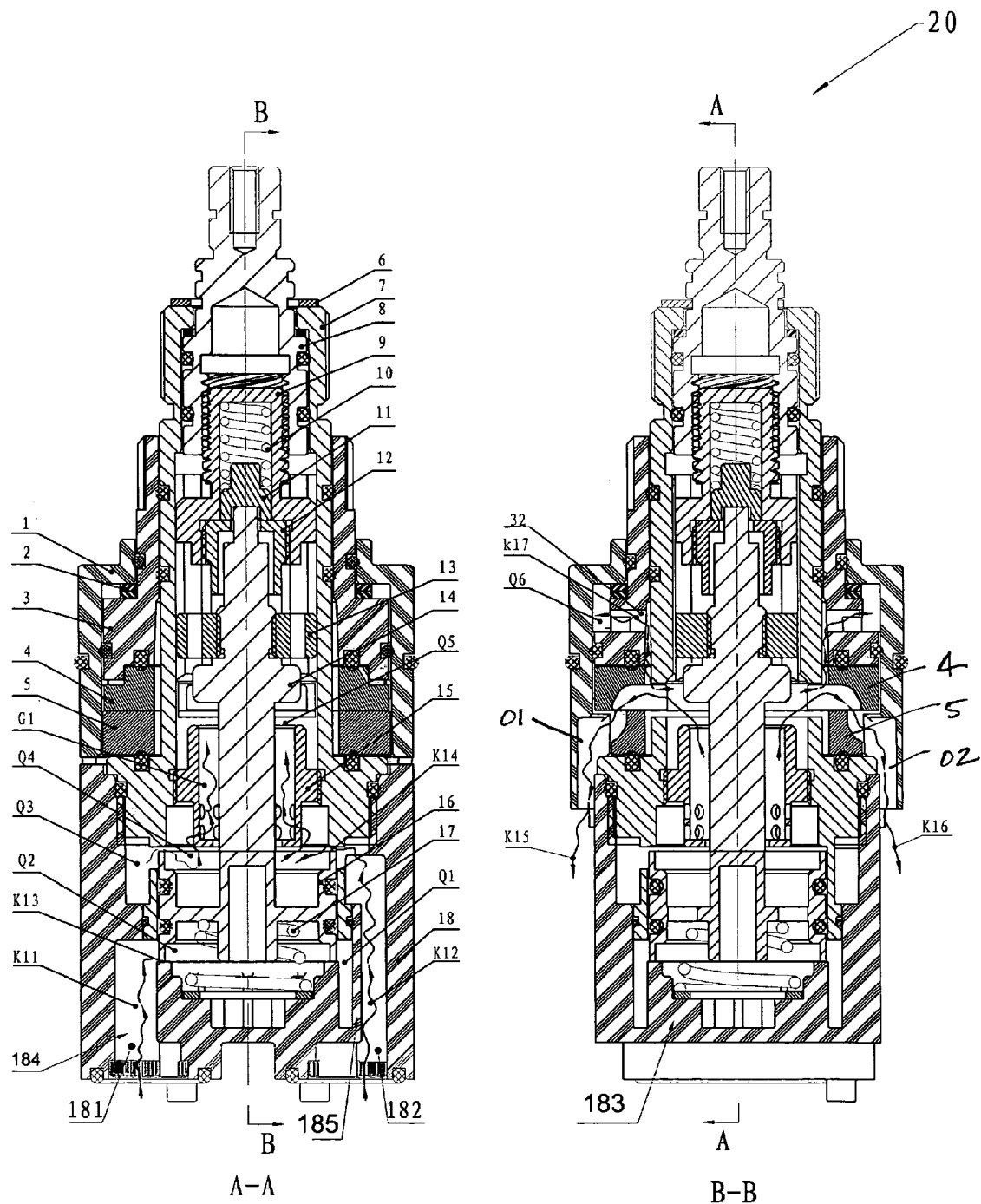
FIG. 6 provides two longitudinal cross-sections of the mixing valve, showing the mixing valve in a cold water discharge position.

Referring to FIG. 4b and section B-B of FIG. 6, the spindle regulator 3 has external engaging members 33 (e.g., threads) and at least one peripheral relief opening 32, preferably two opposed relief openings 32. A pressure relief cavity Q6 is formed between the spindle regulator 3 and an upper portion of the cover 1. The relief cavity Q6 includes a lower, vertical segment that is defined between stem 7 and the spindle regulator 3. Water flows through both the upper disk 5 and the relief opening 32 and into the relief cavity Q6. During operation of the mixing valve 20 and in order to reduce friction upon the spindle regulator 3, the water in the pressure relief cavity Q6 applies downward pressure to the spindle regulator 3 which counter-balances upward pressure applied to the spindle regulator 3 by water flowing through the lower and upper disks 5, 4. The upward pressure further results from water flowing through at least one groove A41, A42 of the upper disk 4 and at least one groove A51, A52 of the lower disk 5. An intermediate portion of the stem 7 is positioned radially inward of the inner edge 44 that defines the central opening 43 of the upper disk 4, wherein water flows between the intermediate stem portion and the inner edge 44 of the upper disk 4 prior to flowing through the relief opening 32 of the spindle regulator 3.

As explained above and as shown in FIGS. 2, 3 and 4, the spindle 8 extends through the stem 7 and fixed by a retaining element 6. A strut 9 is coupled to a lower end of the spindle 8. A protecting spring 10 is positioned between the strut 9 and a press-cap 11 joined to the strut 9. A tightening nut 12 is then coupled to the strut 9. The upper end 141 of a temperature sensor 14 extends through a guide 13 and the tightening nut 12, and is then received by the press-cap 11. The lower end 142 of the temperature sensor extends through a mixer 15 and engages the upper face of a slide bolt 16. A spring 17 resides within the base 18 and between the slide bolt 16 and a central hub 183 of the base 18. As may be seen in FIGS. 3 and 4f, the slide bolt 16 has a central hub 161, a recessed internal wall 162, and a plurality of holes G101 that accommodate the hot water flow path K13 through the slide bolt 16, which leads to the mixer flow path G1 through the mixer 15 (see section A-A of FIG. 3). The base 18 has a hot water inlet 181 and a cold water inlet 182. Preferably, the base 18 includes gaskets 19 and filter elements 19a affixed to the water inlets 181, 182. The mixer 15 is positioned within the lower portion of the stem 7, wherein the mixer 15 is configured to mix water supplied form the hot and cold water inlets 181, 182. The mixer 15 supplies mixed water through the lower and upper disks 5, 4 that exerts the upward pressure applied to the spindle regulator 3. The temperature sensor 14 resides within the mixer 15 and is configured to respond to the temperature of the mixed water therein.

The base 18 includes a central hub 183 and an internal wall arrangement 184, wherein the base 18, the internal wall arrangement 184 and the slide bolt 16 collectively define a substantially circular hot water cavity Q1. Preferably, the internal wall arrangement 184 has a substantially vertical partition wall 185, wherein the hot water cavity Q1 is positioned inward of the partition wall 185. A lower portion of the stem 7 resides outward of the slide bolt 15 and inward of the partition wall 185. The base 18, the internal wall arrangement 184 and the stem 7 collectively define a substantially circular cold water cavity Q3. Preferably, the cold water cavity Q3 is positioned radially outward of the partition wall 185. Depending upon the discharge water temperature selected by an operator, water from the cold and hot water cavities Q3, Q1 flows through the slide bolt 16 and the stem 7 and into the mixing cavity Q4 of the mixer 15. Referring to FIGS. 3 and 6, the hot water cavity Q1 comprises a substantially vertical component for the hot water inlet flow path K11 and a curvilinear component for the hot water flow path K13 leading into the slide bolt 16, wherein the curvilinear component resides outward of the slide bolt 16 and inward of the partition wall 185. The cold water cavity Q3 comprises a substantially vertical component residing outward of the partition wall 185, and a curvilinear component residing above the hot water cavity Q1. The vertical component of the cold water cavity Q3 accommodates the cold water inlet flow path K12 and the curvilinear component provides the cold water path K14 leading into the slide bolt 16. The space among the stem 8, the slide bolt 16 and the mixer 15 defines a water mixing cavity Q4 that leads through the mixer 15. The space above the mixer 15 and below the guide 13 defines a mixed water collecting cavity Q5.

Section A-A of FIG. 3 show the mixing valve 20 in an intermediate or warm water position where both hot and cold water are supplied into the water mixing cavity Q4 and a mixed water composition, presumably at an intermediate or warm temperature, is discharged from the mixing valve 20. To arrive at the intermediate position, the operator actuates the mixing valve 20 by rotating the spindle regulator 3 counterclockwise such that the first groove A41 and the second groove A42 of the rotatable upper disk 4 is brought into alignment with the first groove A51 and the second groove A52 of the lower disk 5 (see FIG. 5a). This alignment of the first upper disk groove A41 with the first lower disk groove A51 provides the first water outlet O1, and the alignment of the second upper disk groove A42 with the second lower disk groove A52 provides the second water outlet O2. Movement of the spindle regulator 3 results in movement of the upper disk 4 because the depending regulator fingers T31, T32 rotatably engage the notches D41, D42 of the upper disk 4. As explained above, the lower disk 5 remains stationary during the rotation of the upper disk 4.

Referring to FIGS. 3 and 5, the hot water inlet flow path K11 is shown with the arrows extending through the hot water inlet 181 of the base 18 and the circular hot water cavity Q1. Because the lower end of the slide bolt 16 is spaced a distance from the hub 183, a clearance results that allows the hot water flow path K13 to enter the hot water cavity Q2 of the slide bolt 16 from below. The cold water inlet flow path K12 is shown with the arrows extending through the cold water inlet 182 and the circular cold water cavity Q3. Because the upper end of the slide bolt 16 is spaced a distance from the stem 7, a clearance results that allows the cold water flow path K14 to enter the slide bolt 16 from above and mix with the hot water flow path K13 in the water mixing cavity Q4. After the hot water and cold water mixes in the water mixing cavity Q4, the mixed water flows through the mixer 15 along the internal mixer flow path G1 and into the water collecting cavity Q5. When the grooves A51, A52 of the lower disk 5 and grooves A41, A42 of the rotatable upper disk 4 are partially or fully aligned to form two water outlets O1, O2, the mixed water will discharge from these two water outlets O1, O2 as outlet flow paths K15, K16. The two water outlets O1, O2 are peripherally located to provide outwardly directed flow paths K15, K16. There is at least one relief flow path K17 into the pressure relief cavity Q6 (above water collecting cavity Q5) for the pressure balancing aspects explained above. The relief flow path K17 is shown with arrows extending through the relief hole 32 of the spindle regulator 3 into the pressure relief cavity Q6.

In the event that the temperature of one of the water supplies unexpectedly changes, the interaction between the temperature sensor 14, the slide bolt 16 and the press-cap 11 enable the mixing valve 20 to automatically maintain a near constant temperature of mixed water. For example, if the temperature of the hot water supply suddenly increases beyond the desired temperature set by the operator, then the temperature of the mixed water in the water mixing cavity Q4 and water collecting cavity Q5 will increase as well. This temperature increase causes the temperature sensor 14 to expand in a downward direction, which also draws the slide bolt 16 downward or closer to the central hub 183. Upward movement of the sensor 14 and the slide bolt 16 is precluded by the press-cap 11, which resists movement due to its internal engagement with the spindle 8. Due to the downward movement of the sensor 14 and the slide bolt 16 towards the central hub 183, the circular hot water path K13 is reduced thereby reducing the quantity of hot water flowing into the water mixing cavity Q4. The downward movement of the slide bolt 16 increases the distance from the upper slide bolt edge to the stem 7 which increases the circular cold water path K14, whereby the quantity of water flowing along the cold water inlet path K12 into the water mixing cavity Q4 is increased. The opposite movement of the temperature sensor 14 and the slide bolt 16 occurs in the situation where the temperature of the cold water supply suddenly increases beyond the desired temperature and the temperature of the mixed water in the mixing cavity Q4 and water collecting cavity Q5 decreases. Accordingly, the expansion of the temperature sensor 14 results in movement of the slide bolt 16 which enables the mixing valve 20 to automatically maintain a near constant temperature of mixed water to be discharged.

FIG. 6 depicts the mixing valve 20 in a cold water only position where cold water is supplied to the water mixing cavity Q4, but hot water is precluded from entering the water mixing cavity Q4 and only cold water discharges from the mixing valve 20. To arrive at the cold water position, the operator actuates the mixing valve 20 by rotating the spindle regulator 3 such that the first groove A41 and the second groove A42 of the rotatable upper disk 4 is brought into alignment with the first groove A 51 and the second groove A52 of the lower disk 5 (see FIG. 5a). This alignment of the first upper disk groove A41 with the first lower disk groove A51 provides the first water outlet O1, and the alignment of the second upper disk groove A42 with the second lower disk groove A52 provides the second water outlet O2. Rotating the spindle 8 clockwise such that the strut 9 moves to its lowest point, wherein the slide bolt 16 moves downward and against the hub 183 of the base 18 thereby preventing hot water from entering into the slide bolt 16 along the hot water flow path K13.

Referring to FIG. 6, the cold water inlet flow path K12 is shown with the arrows extending through the cold water inlet 182 of the base 18 and the circular cold water cavity Q3. Because the upper portion of the slide bolt 16 is spaced a distance from the stem 7, cold water flows into the water mixing cavity Q4 and the slide bolt 16 along the circular cold water path K14. The hot water inlet flow path K11 is shown with the arrows extending through the hot water inlet 181 of the base 18 into the circular hot water cavity Q1. Because the lower edge of the slide bolt 16 rests against the central hub 183, the hot water flow path K13 is precluded from entering the slide bolt 16. After passing through the slide bolt 16 and the water mixing cavity Q4, the cold water enters flows through the mixer 15 along mixer flow path G1 to the water collecting cavity Q5. The cold water then discharges from the peripheral two water outlets O1, O2 which are formed in the manner explained above. There is at least one relief flow path K17 into the pressure relief cavity Q6 (above water collecting cavity Q5) for the pressure balancing as detailed in the preceding paragraphs. The relief flow path K17 is shown with arrows extending through the relief hole 32 of the spindle regulator 3 into the pressure relief cavity Q6.

Figure 7:
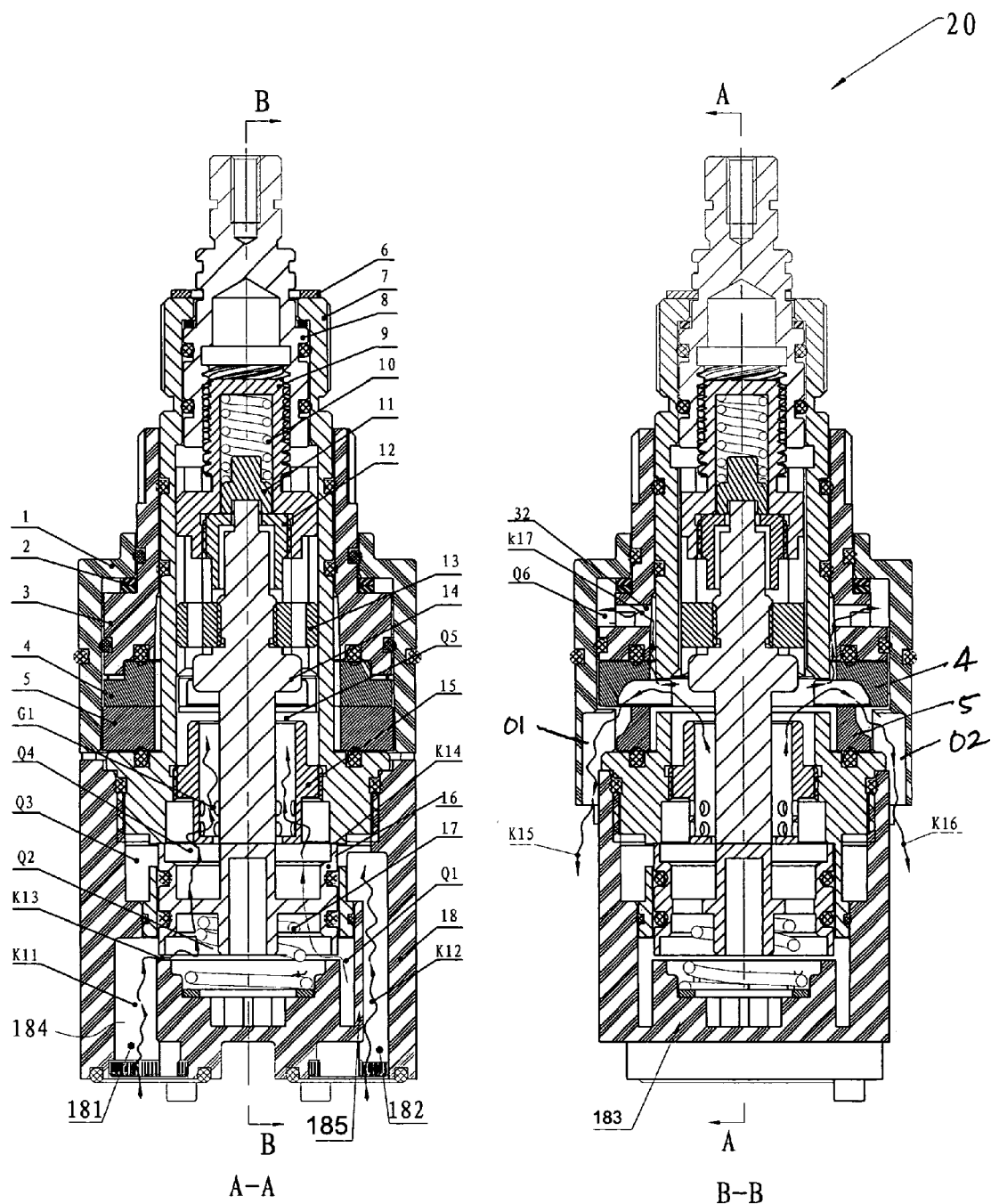
FIG. 7 provides two longitudinal cross-sections of the mixing valve, showing the mixing valve in a hot water discharge position; and, FIG. 8 provides two longitudinal cross-sections of the mixing valve, showing the mixing valve in a closed water discharge position.

FIG. 7 depicts the mixing valve 20 in a hot water only position where hot water is supplied to the water mixing cavity Q4, but cold water is precluded from entering the water mixing cavity Q4 and only hot water is discharged from the mixing valve 20. To arrive at the hot water position, the operator actuates the mixing valve 20 by rotating the spindle regulator 3 such that the first groove A41 and the second groove A42 of the rotatable upper disk 4 are brought into alignment with the first groove A51 and the second groove A52 of the stationary lower disk 5 (see FIG. 5a). This alignment of the first upper disk groove A41 with the first lower disk groove A51 provides the first water outlet O1, and the alignment of the second upper disk groove A42 with the second lower disk groove A52 provides the second water outlet O2. Rotating the spindle 8 counterclockwise moves the strut 9 moves to its highest point, wherein the slide bolt 16 is moved upward into engagement with the stem 7 thereby the preventing water from entering the slide bolt 16 along the cold water flow path K14.

Referring to FIG. 7, the hot water inlet flow path K11 is shown with the arrows extending through the hot water inlet 181 of the base 18 and the circular hot water cavity Q1. Because the lower portion of the slide bolt 16 is spaced a distance from the central hub 183 of the base 18 (which creates a gap), hot water flows into the hot water cavity Q2 and the slide bolt 16 along the hot water flow path K13. Hot water flows through the slide bolt 16 to the water mixing cavity Q4, and then into the mixer 15 and along the mixer flow paths G1. The cold water inlet flow path K12 is shown with the arrows extending through the cold water inlet 182 of the base 18 into the circular cold water cavity Q3. Because the upper edge of the slide bolt 16 rests against the lower edge portion of the stem 7, the cold water flow path K14 is precluded from entering the slide bolt 16 and the mixer 15, and is thereby restricted to the cold water cavity Q3. After passing through the slide bolt 16 and the water mixing cavity Q4, hot water enters the water collecting cavity Q5 through the mixer 15. The hot water then discharges from the two water outlets O1, O2 formed from alignment of the upper grooves A51, A52 with the lower grooves A41, A42, as explained above. There is at least one relief flow path K17 into the pressure relief cavity Q6 (above water collecting cavity Q5) for the pressure balancing explained above. The relief flow path K17 is shown with arrows extending through the relief hole 32 of the spindle regulator 3 into the pressure relief cavity Q6.

Figure 8:
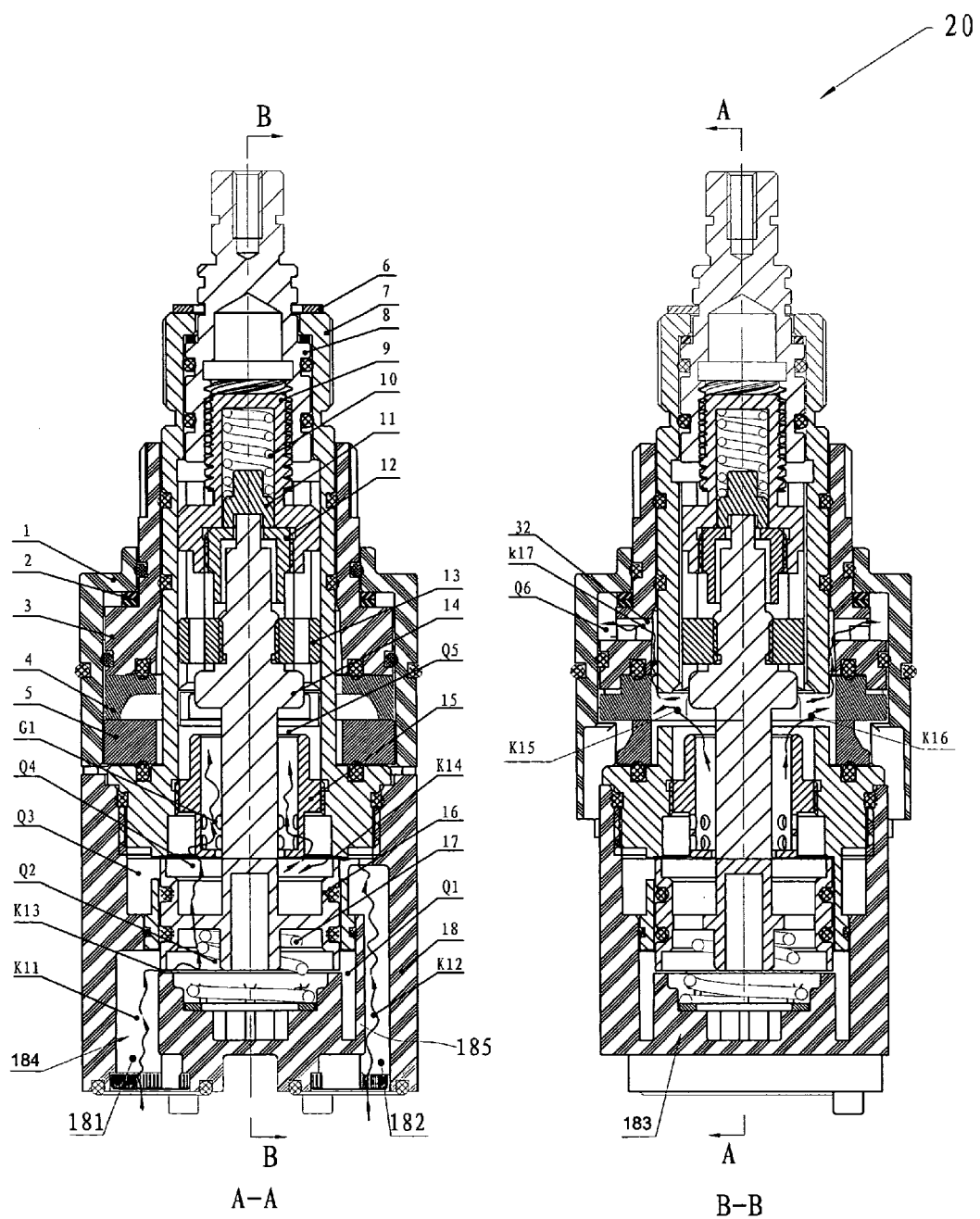

As may be seen in FIGS. 5c and 8, the mixing valve 20 is moveable to a closed position which prevents the discharge of hot water, cold water or warm water from the mixing valve 20. To arrive at the closed position, the operator actuates the mixing valve 20 whereby the spindle regulator 3 is rotated such that the first groove A41 and the second groove A42 of the rotatable upper disk 4 are misaligned with the first groove A51 and the second groove A52 of the stationary lower disk 5, whereby no water outlets O1, O2 are formed (see section B-B of FIG. 8).

Due to rotation of the spindle 8, the strut 9 moves to its highest point, wherein the slide bolt 16 is moved to an intermediate position similar to that of the mixed water position of FIG. 3. Referring to FIG. 8, the hot water inlet flow path K11 (represented with arrows) extends through the hot water inlet 181 of the base 18 and the circular hot water cavity Q1. Because the lower end of the slide bolt 16 is spaced a distance from the hub 183, a clearance results that allows the hot water flow path K13 to enter the hot water cavity Q2 of the slide bolt 16. The cold water inlet flow path K12 is shown with the arrows extending through the cold water inlet 182 and the circular cold water cavity Q3. Because the upper end of the slide bolt 16 is spaced a distance from the stem 7, a clearance results that allows the cold water flow path K14 to enter the slide bolt 16 and mix with the hot water flow path K13 in the water mixing cavity Q4. After the hot water and cold water mixes in the water mixing cavity Q4, the mixed water flows through the mixer 15 along mixed flow path G1 and into the water collecting cavity Q5. However, the mixed water is precluded from discharge from the mixing valve 20 since no water outlets O1, O2 are formed. As explained in the foregoing paragraph, no water outlets O1, O2 are formed because the grooves A51, A52 of the stationary lower disk 5 are not aligned with grooves A41, A42 of the rotatable upper disk 4.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A thermostatic mixing valve for use within a water discharge fixture, the mixing valve comprising:
   a cover;
   a base connected to the cover, the base having a hot water inlet and a cold water inlet, the base further having an internal wall arrangement;
   a slide bolt residing within the base;
   a mixer residing within the base;
   a stem residing in both the base and the cover;
   wherein the base, the internal wall arrangement and the slide bolt collectively define a hot water cavity, and wherein the base, the internal wall arrangement and the stem collectively define a cold water cavity; and,
   wherein depending upon the discharge water temperature selected by an operator, water from the cold and hot water cavities flows through the slide bolt and the stem and into the mixer.

2. The mixing valve of claim 1, wherein the internal wall arrangement has a substantially vertical partition wall, the hot water cavity positioned inward of the partition wall.

3. The mixing valve of claim 2, wherein the cold water cavity is positioned outward of the partition wall.

4. The mixing valve of claim 2, wherein the hot water cavity comprises a substantially vertical component and a curvilinear component, the curvilinear component residing inward of the partition wall.

5. The mixing valve of claim 2, wherein the cold water cavity comprises a substantially vertical component residing outward of the partition wall, and a curvilinear component residing above the hot water cavity.

6. The mixing valve of claim 1, wherein a lower portion of the stem resides outward of the slide bolt and inward of the partition wall of the base.

7. The mixing valve of claim 1, wherein in a cold water discharge position, a lower edge of the slide bolt rests against a central hub of the internal wall arrangement which prevents hot water from the hot water cavity from entering the slide bolt, and wherein cold water from the cold water cavity passes through both the slide bolt and the stem and then into the mixer.

8. The mixing valve of claim 1, wherein in a hot water discharge position, an upper edge of the slide bolt rests against the stem which prevents cold water from the cold water cavity from entering the slide bolt, and wherein hot water from the hot water cavity passes through both the slide bolt and the stem and then into the mixer.

9. The mixing valve of claim 1, wherein in a warm water discharge position, a lower edge of the slide bolt is spaced a distance from a central hub of the internal wall arrangement, wherein hot water from the hot water cavity passes through both the slide bolt and the stem and then into the mixer.

10. The mixing valve of claim 9, wherein in the warm water discharge position, an upper edge of the slide bolt is spaced a distance from the stem, wherein cold water from the cold water cavity passes through both the slide bolt and the stem and then into the mixer.

* * * * *